Patented May 10, 1949

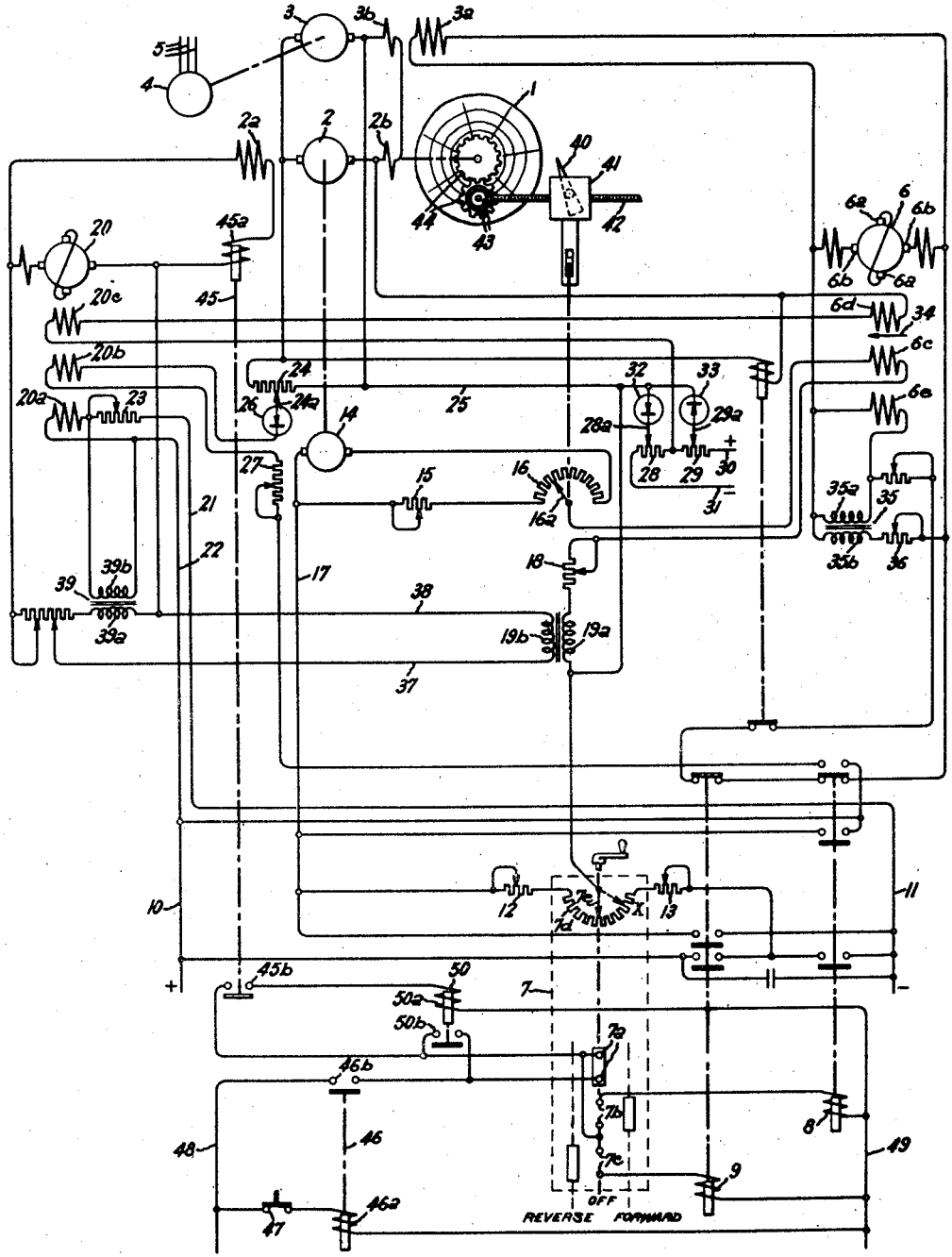

2,469,899

UNITED STATES PATENT OFFICE 2,469,899

MOTOR CONTROL SYSTEM

Earl H. Sills, Schenectady, N. Y., assignor to General Electric Company, a corporation of New York Application August 28, 1947, Serial No. 771,059

5 Claims. (Cl. 318—145)

1

This invention relates to control systems, more particularly to control systems for electric motors, and it has for an object the provision of a simple, reliable and efficient control system of this character.

More specifically, the invention relates to motor control systems in which the motor is supplied from an adjustable voltage generator and in which the speed of the motor is increased from zero to maximum first by strengthening the generator field and subsequently weakening the motor field in response to movement of a master switch and in which provision is made for maintaining the motor speed substantially constant at a value corresponding to the position of the master switch.

Another object of the invention is the provision in a control system of this character of separate exciter dynamoelectric machines for the generator and motor fields and in which provision is made for controlling the generator field exciter directly in response to movement of the master switch and in which means are provided for controlling the motor field exciter jointly in response to a reference voltage which is determined by the position of the master switch and a voltage which is derived from the generator voltage.

A still further object of the invention is the provision of means for controlling the motor field exciter to maintain maximum field strength of the motor until the generator voltage attains a predetermined value in response to movement of the master switch in the speed increasing direction, and then to weaken the field of the motor in response to increase of the generator voltage above this predetermined value. A correlated object is the coordination of the control of the exciters to strengthen the motor field to the maximum value in response to a relatively small decrease of the generator voltage to the predetermined value as a result of movement of the master switch toward the zero speed position and subsequently to decrease the field and voltage of the generator in response to further movement of the master switch toward the zero speed position.

An additional object of the invention is the provision of means for effecting operation of the motor at substantially constant horsepower in a range of speed above the basic speed of the motor.

In carrying the invention into effect in one form thereof, an electric motor is connected to be supplied from an adjustable voltage generator. Separate exciter dynamoelectric machines are provided for furnishing excitation to the generator field and to the motor field respectively, and a master switch is provided for controlling the exciters first to strengthen the generator field and subsequently to weaken the motor field as it is moved from the zero speed position toward the high speed position, and to strengthen the motor field and weaken the generator field as the master switch is returned toward the zero speed position. A control circuit which includes the control field winding of the motor field exciter is provided for comparing a voltage derived from the generator voltage with a reference voltage. A uni-directional conducting device prevents current from flowing in this comparison circuit for generator voltages less than a predetermined value, and permits current to flow in the circuit to cause the exciter to weaken the motor field for generator voltages greater than this predetermined value.

For a better and more complete understanding of the invention, reference should now be had to the following specification and to the accompanying drawing of which the single figure is a simple, schematic diagram of an embodiment of the invention as applied to a machine for stripping or cutting veneer from a rotating log.

Referring now to the drawing, a log 1 is mounted in the centers of a veneer cutting lathe and is rotated by means of an electric motor 2 having a separately excited field winding 2a and a series commutating field winding 2b.

This motor is supplied from a suitable source of adjustable voltage such as the adjustable voltage generator 3 with the armature of which the armature of the motor is connected in a closed loop circuit. As shown, the generator is provided with a separately excited field winding 3a and with a series commutating field winding 3b. The generator is driven at a speed that is preferably substantially constant by suitable driving means which is illustrated as an induction motor 4 which is supplied from a suitable polyphase source that is represented by the three supply lines 5. The voltage of the generator 3 can be varied over a wide range by varying its excitation, and to this end, the separately excited field winding 3a is excited by means of a special cross armature reaction-excited, direct armature reaction-compensated dynamoelectric machine 6. This machine differs from a conventional D.-C. machine in that it has a pair of auxiliary brushes 6a arranged on an axis that is normally displaced substantially 90 electrical degrees from the axis of the main load brushes 6b. These auxiliary brushes 6a are substantially short circuited by an external conductor. The machine 6 is provided with a control field winding 6c which has a relatively small number of ampere turns. However, the relatively small voltage generated in the armature winding between the auxiliary brushes 6a as a result of the rotation of the armature in the flux of the control field winding causes a very large current of flow in the short circuit. This short circuit gives rise to a very large cross armature flux. It is this cross armature reaction flux which provides the main operating flux or excitation for the machine. The machine 6 is driven by any suitable driving means such as an induction motor (not shown), at a speed which is preferably substantially constant. It could be driven by the induction motor 4 if desired. Two very important operating characteristics of the armature reaction-excited machine 6 which result from the structure described in the foregoing are an exceptionally high speed of response and a high amplification factor, i. e. the ratio between the watts input to the control field winding and the watts output of the load brush circuit.

The increase and decrease of the voltage of the supply generator 3 and consequently the corresponding acceleration and deceleration of the motor 2 which is supplied therefrom are under the control of a suitable reversing type master switch 7. It is illustrated as comprising a normally closed contact 7a and normally open contacts 7b and 7c together with a potentiometer resistor 7d and a cooperating slider contact 7e.

The main directional or control field winding 6c is arranged to be connected for forward and reverse energization, thereby to provide for generation of voltage of either polarity by the supply generator 3 and thereby to provide for operation of the motor 2 in either direction as desired. For this purpose a pair of directional contactors 8 and 9 are provided for connecting the master switch potentiometer 7d to the excitation buses 10 and 11 for voltages of either polarity at the terminals thereof. The excitation buses 10, 11 represent any suitable substantially constant source of direct voltage; the bus 10 may be assumed to be positive and the bus 11 may be assumed to be negative. Variable resistors 12 and 13 are connected in circuit between opposite terminals respectively of the potentiometer 7d and the excitation source. It may be assumed that the direction in which the motor 2 rotates when the contactor 8 is closed is the forward direction, and conversely that the direction in which the motor rotates when the contactor 9 is closed is the reverse direction.

When the slider 7e of the master switch is in its extreme clockwise position at the left-hand terminal of the potentiometer, it is in its minimum or zero speed position. In any other position of the slider on the potentiometer a voltage exists between the left-hand terminal and the slider which is utilized as a reference voltage for determining and regulating the speed of the motor. This regulation is accomplished by comparing a signal voltage proportional to the speed of the motor with the reference voltage and utilizing the difference of these two voltages to excite the main control field winding 6c of the exciter dynamoelectric machine. For the purpose of obtaining a signal voltage proportional to motor speed a tachometer generator 14 is provided which is connected to be driven by the motor 2. It has a linear characteristic so that the voltage which appears at its armature terminals is proportional to speed. Across its armature terminals is connected a voltage-dividing circuit comprising a resistor 15 and a potentiometer 16 which is provided with a cooperating slider 16a. By means of a conductor 17, the terminal of the tachometer generator 14 which is positive when the motor 2 is rotating in the forward direction is connected to the terminal of the resistor 12 which is connected to the positive exciter bus 10 when the master switch is operated to the forward position. Completing the comparison circuit is a connection from the slider 16a to the slider 7e which includes in series relationship the control field winding 6c of the exciter 6, variable resistor 18 and the primary winding 19a of a transformer 19. Since the voltage drop across the resistor 15 and the active portion of the potentiometer 16 is in opposition to the voltage drop across the resistor 12 and the active portion of the potentiometer 7d, the control field winding 6c is energized in response to the difference of the voltages at the sliders 16a and 7e. As a result, the exciter 6 excites the field winding 3a of the supply generator in proportion to the difference of the voltages at the sliders to cause the generator to generate a corresponding voltage and to effect rotation of the motor at a corresponding speed.

Excitation is supplied to the separate field winding 2a of the motor by means of an armature reaction-excited dynamoelectric machine 20 which is substantially identical with the machine 6 which supplies excitation to the generator field. As shown, the machine 20 is provided with a main control field winding 20a which is connected across the excitation buses 10 and 11 by means of conductors 21 and 22. A variable resistor 23 is included in the circuit of this field winding. For the purpose of weakening the motor field, the exciter machine 20 is provided with an opposing control field winding 20b which is excited in accordance with the difference between a reference voltage and a voltage derived from the armature voltage of the generator 3. The reference voltage in this case is the voltage between the left-hand terminal of the resistor 12 and the slider 7e of the master switch potentiometer and the voltage derived from the generator armature voltage is the voltage between the right-hand terminal and the slider 24a of a potentiometer 24 which is connected across the armature terminals of the generator. A conductor 25 connects the right-hand terminal of the potentiometer 24 with the slider 7e of the master switch and the comparison circuit is completed from the slider 24a through a uni-directional conducting device 26, the control field winding 20b and a variable resistor 27 to the positive excitation bus 10 which is connected to the left-hand terminal of the resistor 12 when the master switch is operated to the forward position and to the right-hand terminal of the resistor 13 when the master switch is operated to the reverse position. Thus, the control field winding 20b is excited by the difference of the reference voltage and the derived voltage. Since the control field winding 20b opposes the excitation of the control field winding 20a the net excitation of the exciter 20 is weakened in proportion to the excitation of winding 20b, thereby effecting a corresponding weakening of the motor field 2a.

The function of the uni-directional conducting device 26 is to prevent excitation of the control field winding 20b and thereby to prevent any weakening of the motor field until the voltage of the generator attains a predetermined value. This predetermined value is approximately equal to the full voltage value, i. e. the voltage which appears at the terminals of the generator when it is driven at full speed and has full field excitation.

For the purpose of limiting the current transmitted between the armatures of the generator 3 and the motor 2 to a predetermined maximum value, the dynamoelectric machine 6 is provided with an additional field winding 6d arranged on the load axis of the machine and connected so that it acts differentially with respect to the main control field winding 6c; and the dynamoelectric machine 20 is provided with an additional field winding 20c which is connected to act cumulatively with respect to the main control field winding 20a. These two additional control field windings 6d and 20c are connected in series relationship and are energized by a voltage equal to the difference between a reference voltage and a voltage proportional to the current tranmitted between the armatures of the generator and motor. This reference voltage is provided by means of a variable bias potentiometer which comprises two separate variable resistors 28 and 29 connected in series relationship to a suitable source of substantially constant direct voltage which is represented by the conductors 30 and 31. The source 30, 31 may be the same source as that represented by the conductors 10 and 11 or it may be a separate source. The bus 30 is assumed to be positive and the bus 31 is assumed to be negative.

The voltage proportional to the current transmitted between the armatures between the generator 3 and motor 2 is provided by means of a suitable voltage drop device which is included in the armature loop circuit. Although a suitable shunt resistor may be employed for this purpose, it is preferable to use the voltage drop across the commutating field windings 2b and 3b. The armature terminal of the commutating field winding 3b is connected by the conductor 25 and reversely connected half-wave rectifiers 32 and 33 to the sliders 28a and 29a, and an intermediate point of voltage of the potentiometer, i. e. the common terminal of the resistors 28 and 29 is connected through the control field windings 20c and 6d to the armature terminal of the commutating field winding 2b. The reversely connected rectifiers 32 and 33 provide for comparing the voltage drop across the commutating field windings 2b and 3b with the voltage drop across one or the other of the active portions of the resistors 28 and 29 depending upon the direction of current flow between the armatures of the generator and motor, and they also serve to prevent energization of the current limit field windings 6d and 20c at all times when the current transmitted between the armatures of the generator 3 and motor 2 is less than a predetermined value. This predetermined value may be adjusted as desired by adjusting the positions at the sliders 28a and 29a.

When the left-hand armature terminal of generator 3 is positive and when the voltage drop across the commutating field windings 2b and 3b exceeds the voltage drop between the common terminal of the resistors and the slider 29a, a current will flow through the field windings 6d and 20c in the direction indicated by the solid arrow 34. Conversely, when the current transmitted between the generator and the motor is in the reverse direction and the voltage drop between the commutating field windings 2b and 3b exceeds the voltage drop between the common terminal of the resistors and the slider 28a, current will flow through the field windings 6d and 20c in the reverse direction.

If in the progress of building up the generator voltage the current limit should be exceeded, then the current limit field winding 6d becomes energized and opposes the excitation of the control field winding 6c, thereby reducing the net excitation of the exciter machine 6. On the other hand, the excitation of the field winding 20c adds to the excitation of the main control field winding 20a of the motor field exciter machine, thereby increasing its net excitation. The combined effect is to weaken the net excitation of the generator field exciter and to strengthen the net excitation of the motor field exciter to the values required to cause the maximum permissible current to flow in the armature loop circuit of the generator and motor.

For the purpose of preventing "hunting" the exciter dynamoelectric machines 6 and 20 are provided with anti-hunt control field windings. As shown, the machine 6 is provided with an anti-hunt field winding 6e which is connected across the secondary winding 35a of a transformer 35 of which the primary winding 35b is connected across the load brushes of machine 6. This field winding 6e is connected so as to oppose any sudden change in the armature voltage of machine 6, thereby to eliminate over-shooting. A voltage is induced in the secondary winding of the anti-hunt transformer 35 only when the change in armature voltage is sudden. The voltage induced in the secondary winding is proportional to the rate of change of the armature voltage. A resistor 36 which is connected in series with the primary winding 35b adjusts the effect of the anti-hunt field winding. In addition, a voltage proportional to the rate of change of armature voltage of the motor field exciter 20 is added into the circuit of the main control field winding 6c by means of the anti-hunt transformer of which the secondary winding 19a is connected in the circuit of the control field winding and the primary winding 19b is connected across the armature terminals of the machine 20 by means of conductors 37 and 38. The inclusion of the transformer 19 is optional.

Similarly, a voltage proportional to the rate of change of the armature voltage of the exciter machine 20 is supplied to the main control field winding 20a of this machine by means of an anti-hunt transformer 39 of which the primary winding 39a is connected across the load terminals of the machine 20 and of which the secondary winding 39b is connected to the terminals of the main control field winding 20a.

Veneer is stripped or shaved from the log 1 by means of a blade 40 of a suitable knife which is secured to a nut 41 that travels along a lead screw 42 that is rotated in response to rotation of the lathe spindle to which it is connected by means of suitable bevel gearing 43 and spur gearing 44. By means of a pin and slotted rod connection between the travel nut 41 and the slider 16a of the potentiometer 16, the slider is moved to vary the resistance of the potentiometer as the knife 40 is fed toward the center of the log. The knife position potentiometer 16 adjusts the portion of the tachometer generator voltage which opposes the reference voltage. Thus, as the knife moves in and decreases the diameter of the log, the speed of the tachometer generator must increase to maintain the balanced condition between the reference voltage and the opposing control voltage.

With the foregoing understanding of the elements and their organization, the operation of the system itself will readily be understood from the following detailed description: With full voltage on the excitation buses 10 and 11, and with the supply generator 3 and the exciter dynamoelectric machines 6 and 20 being driven at full speed by their respective driving motors, the control field winding 20a will be fully excited and the exciter machine 20 will be supplying full exciting current to the field winding 2a of the motor. Consequently, the operating coil 45a of the field loss relay 45 is energized and the contacts 45b are closed. The circuit of the operating coil 46a of a line contactor is completed through contacts 47 of suitable overload protection switching devices to a suitable source of alternating voltage which is represented by supply lines 48 and 49. Responsively to energization, the contactor 46 closes its contacts 46b to complete an energizing circuit for the operating coil 50a of under-voltage relay 50 through the normally closed contacts 7a of the master switch. In response to energization, under-voltage relay 50 closes its contacts 50b to short circuit the contacts 7a and thereby to maintain an energizing circuit for the coil of the under-voltage relay when the master switch is moved from its off position to one of its operating positions.

The lathe driving motor 2 is started in the forward direction by moving the master switch to the forward position in which it closes its normally open contacts 7b to complete an energizing circuit for the operating coil of the forward contactor 8 which responds and closes its contacts 8b and 8c to complete connections of the potentiometer circuit to the excitation buses. The resulting voltage drop across the resistor 12 causes current to flow in the comparison circuit through the control field winding 6c, thereby to cause the exciter 6 to supply a small current to the field winding 3a of the supply generator. As a result, the motor 2 is started from rest. A voltage proportional to the speed of the motor appears at the terminals of the tachometer generator 14 which causes the current to flow through the resistor 15 and knife position potentiometer 16, thereby to produce voltage drops which oppose the voltage drop across the resistor 12. As the speed of the motor increases, these voltage drops across resistors 15 and 16 increase until a balanced condition of the system is reached with the voltage drops across resistors 15 and 16 almost equal to the voltage drop across resistor 12.

Current flowing in the potentiometer 24 as a result of the voltage across the generator terminals produces a voltage between the right-hand armature terminal of the generator and the slider 24a which is proportional to the generator voltage. However, this derived voltage is less than the reference voltage between the bus 10 and the slider 7e and consequently no current flows in the opposing control field winding 20b. Thus, the net excitation of the machine 20 is maximum and the motor field is maintained fully excited.

The master switch is moved by the operator to a position which corresponds to the speed of the motor 2 which will result in the desired foot per minute speed of the veneer cut from the log 1. At a predetermined value of the reference voltage which is asssumed to be the voltage corresponding to the position X, of the slider on the potentiometer 7d the derived voltage between the generator terminal and the slider 24a will equal the reference voltage. As the generator voltage increases beyond this value, current will flow from the slider through the opposing control field winding 20b, thereby weakening the net excitation of the exciter 20 and effecting a corresponding weakening of the motor field. Thus, any further increase in the generator voltage will result in weakening the field of the motor to increase its speed.

The master switch remains in the position to which it was moved by the operator and the cutting of the veneer proceeds at a speed corresponding to this position.

As the knife is fed inwardly toward the center of the log to decrease its diameter, the slider 16a of the knife position potentiometer is moved in a counterclockwise direction to decrease the portion of the tachometer generator voltage which opposes the reference voltage. Consequently, the difference between the two voltages is increased, thereby resulting in a further increase in generator voltage which in turn results in a further weakening of the motor field to increase its speed. A balanced condition results when the derived portion of the tachometer generator voltage approximately equals the reference voltage. As the diameter of the log is progressively decreased by the continuous feeding of the blade toward its center, the operation described in the foregoing is continued. As a result, the velocity of the veneer is maintained constant although the diameter of the log is decreased. In other words, by maintaining the voltage supplied to the armature of the motor 2 substantially constant and weakening its field to correspond with the decreasing diameter of the log, the motor is operated at substantially constant horsepower. This results in substantially constant velocity and tension of the veneer.

At the completion of the cut the master switch is returned toward the off position. During the initial return movement of the master switch the voltage of the generator is lowered a small amount, and this results in a relatively large decrease in the field strength of the opposing control field winding 20b of the motor field exciter. As a result of the weakening of the opposing field, the net excitation of the exciter is increased and this results in a corresponding increase in the field strength of the motor 2. In the event that the pump-back current exceeds the predetermined value which is determined by the setting of the sliders 28a and 29a, the field winding 6d tends to maintain the generator voltage at a sufficiently high value and the field winding 20c tends to limit the strengthening of the motor field to a value such that the combined effect prevents the pump-back current from exceeding the predetermined safe value.

Further movement of the master switch toward the off position continues to reduce the generator voltage at a relatively slow rate and to strengthen the field of the motor at a relatively higher rate. When the derived voltage between the slider 24a and the generator armature terminal becomes less than the reference voltage between the conductor 10 and the slider 7d, current ceases to flow in the control field winding 20b. Consequently the net excitation of the motor field exciter 20 is maximum and the excitation of the motor field is at full normal strength. Further movement of the master switch to the zero position reduces the generator voltage substantially to zero and the motor 2 is regeneratively braked to standstill.

The knife 40 is then retracted to its initial position and the apparatus is left in a reset condition to repeat the operation described in the foregoing.

In the event that operation of the motor 2 in the reverse direction is required, this is accomplished by moving the master switch to the left-hand side or "reverse" operating positions. Reverse operation is substantially identical with the forward operation and will readily be understood from the foregoing description of the forward operation.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States, is:

1. A control system comprising a generator, a motor supplied from said generator, means for varying the voltage of said generator to vary the speed of said motor, a source of reference voltage, means for deriving a control voltage from said generator voltage, means for supplying exciting current to the field winding of said motor comprising a dynamoelectric machine provided with a control field winding connected to be responsive to the difference of said derived voltage and said reference voltage to control said dynamoelectric machine to weaken the field of said motor and a rectifier in circuit with said control field winding for preventing excitation of said control field winding when said derived voltage is less than said reference voltage to maintain a relatively strong excitation of said motor for voltages of said generator less than a predetermined value and for effecting excitation of said control field winding when said derived voltage exceeds said reference voltage to weaken said motor field for generator voltages in excess of said predetermined value.

2. A control system comprising in combination an adjustable voltage generator, a motor connected to be supplied from said generator, a source of substantially constant voltage, a source of reference voltage, means for supplying exciting current to the field winding of said motor comprising an armature reaction excited dynamoelectric machine provided with a first control field winding excited from said constant voltage source and with an opposing control field winding connected to be excited in response to the difference of a voltage derived from the voltage of said generator and said reference voltage, and a blocking rectifier connected in circuit with said opposing control field winding to prevent the energization, and to maintain full field excitation of said motor for generator voltages less than a predetermined value and to effect excitation of said opposing control field winding to effect field weakening of said motor for generator voltages in excess of said predetermined value.

3. A control system comprising an adjustable voltage generator, a motor connected to be supplied from said generator, a source of substantially constant voltage, means for adjusting the voltage of said generator comprising a tachometer generator driven by said motor for producing a voltage proportional to speed, a master switch having a resistor connected across said constant voltage source and a cooperating slider for deriving a reference voltage, means for supplying exciting current to said generator comprising a dynamoelectric machine provided with a control field winding connected to be excited by the difference of said speed voltage and said reference voltage, means for supplying exciting current to the field of said motor comprising a second dynamoelectric machine having a first control field winding connected to be supplied from said constant voltage source, and an opposing control field winding connected to be excited by the difference of said reference voltage and a voltage derived from the armature voltage of said generator.

4. A control system comprising an adjustable voltage generator, a motor connected to be supplied from said generator, a source of substantially constant voltage, means for adjusting the voltage of said generator comprising a tachometer generator driven by said motor for producing a voltage proportional to speed, a master switch having a resistor connected across said constant voltage source and a cooperating slider for deriving a reference voltage, means for supplying exciting current to said generator comprising a dynamoelectric machine provided with a control field winding connected to be excited by the difference of said speed voltage and said reference voltage, means for supplying exciting current to the field of said motor comprising a second dynamoelectric machine having a first control field winding connected to be supplied from said constant voltage source, an opposing control field winding connected to be excited by the difference of said reference voltage and a voltage derived from the armature voltage of said generator, and a rectifier included in circuit with said opposing control field winding and poled to permit current to flow in said opposing winding to effect field weakening of said motor only in response to generator voltages in excess of a predetermined value.

5. A control system comprising an adjustable voltage generator, a motor connected to be supplied from said generator, a source of substantially constant voltage, means for adjusting the voltage of said generator comprising a tachometer generator driven by said motor for producing a voltage proportional to speed, a resistance having a variable portion provided with a slider connected across the armature terminals of said tachometer generator, a master switch comprising a resistor connected across said constant voltage source and a slider cooperating therewith for deriving a reference voltage, means for supplying exciting current to said generator comprising a dynamoelectric machine provided with a control field winding connected between said sliders to be energized by the difference of said reference voltage and said speed voltage, a potentiometer provided with a slider connected across the armature of said adjustable voltage generator, a control circuit comprising a connection from the slider of said potentiometer to one side of said source and a connection from one terminal of said potentiometer to the slider of said master switch rheostat, means for supplying exciting current to the field of said motor comprising a second dynamoelectric machine having a control field winding connected to be supplied from said constant voltage source and an opposing control field winding included in said control circuit to be responsive to the difference of said reference voltage and a voltage derived from the armature circuit of said generator, and a rectifier included in said control circuit poled to prevent current flow in said opposing control winding to effect field weakening of said motor only in response to generator voltages in excess of a predetermined value.

EARL H. SILLS.

REFERENCES CITED

The following references are of record in the file of this patent:

UNITED STATES PATENTS

| Number | Name | Date |
| --- | --- | --- |
| 2,301,689 | Edwards et al. | Nov. 10, 1942 |
| 2,329,538 | Huston | Sept. 14, 1943 |